April 7, 1959  E. PUGSLEY, JR., ET AL  2,880,765
APPARATUS FOR INTRODUCING DEPOLARIZER INTO DRY CELL CANS
Filed Dec. 18, 1953  3 Sheets-Sheet 1
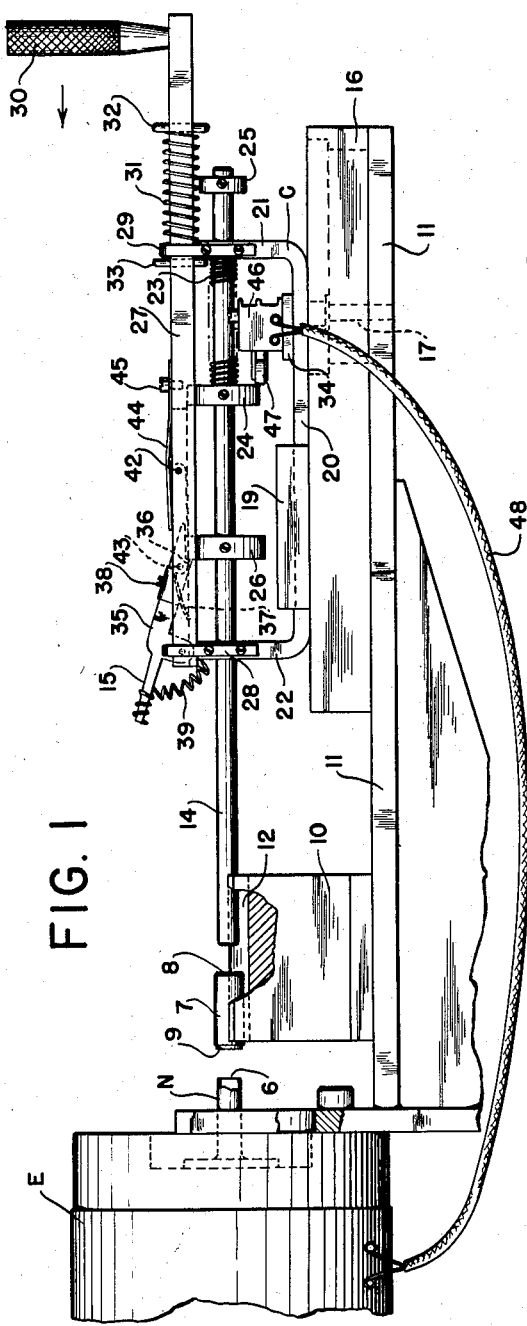
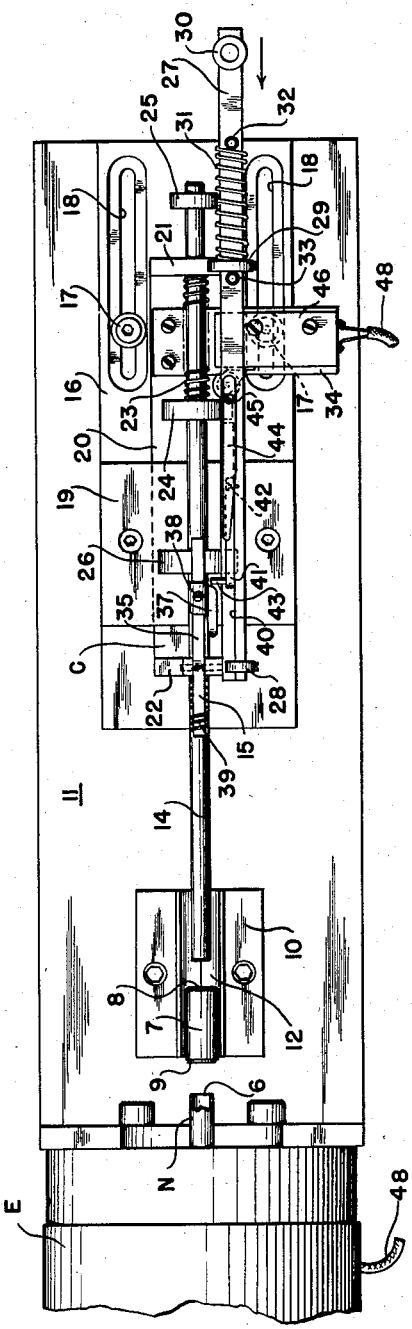
INVENTORS
Edwin Pugsley, Jr.
BY Otto K. Reinhardt
ATTORNEYS April 7, 1959  E. PUGSLEY, JR., ET AL  2,880,765
APPARATUS FOR INTRODUCING DEPOLARIZER INTO DRY CELL CANS
Filed Dec. 18, 1953  3 Sheets-Sheet 2
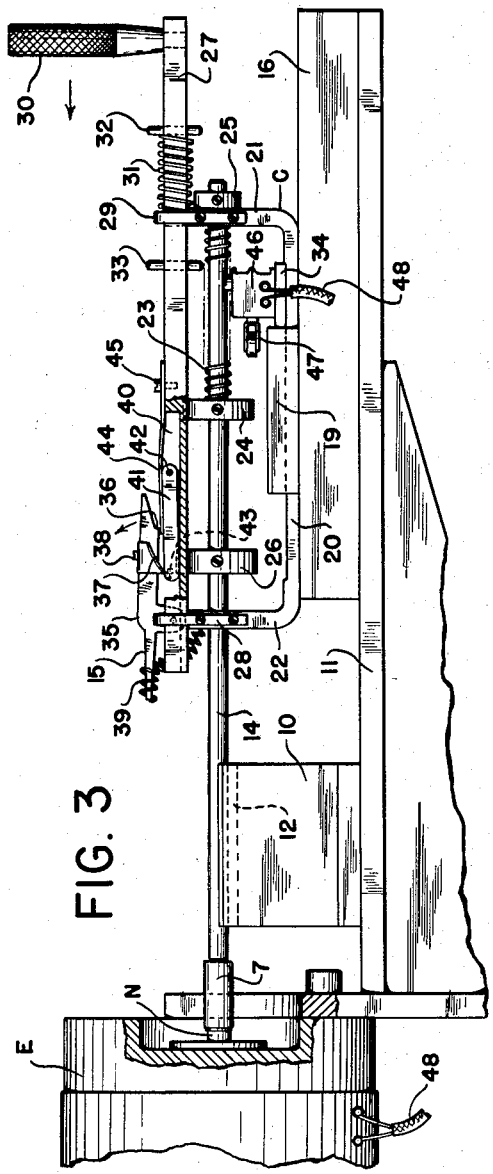
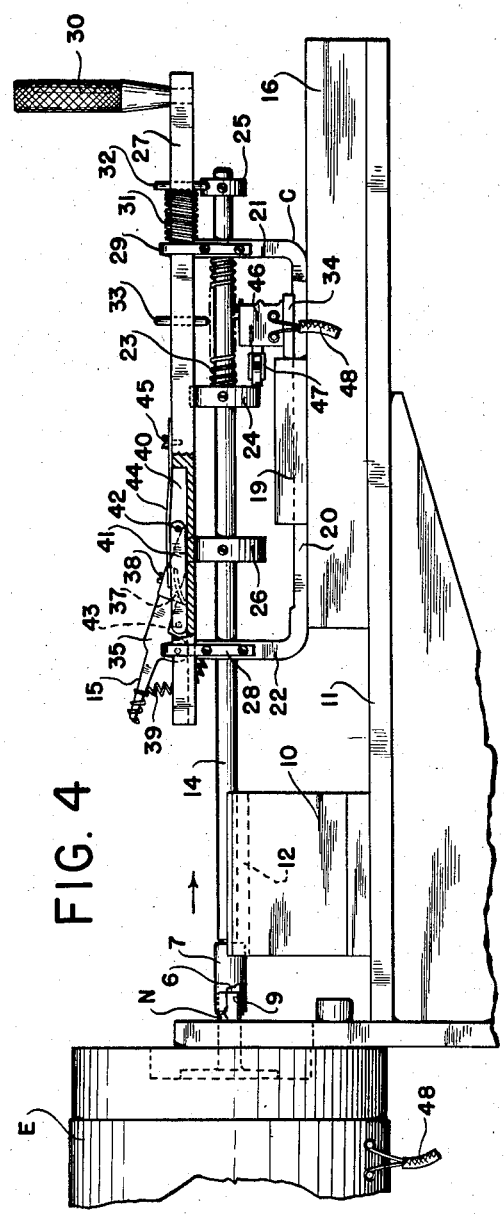
INVENTORS
Edwin Pugsley, Jr.
Otto K. Reinhardt
BY
ATTORNEYS April 7, 1959  E. PUGSLEY, JR., ET AL  2,880,765
APPARATUS FOR INTRODUCING DEPOLARIZER INTO DRY CELL CANS
Filed Dec. 18, 1953  3 Sheets-Sheet 3
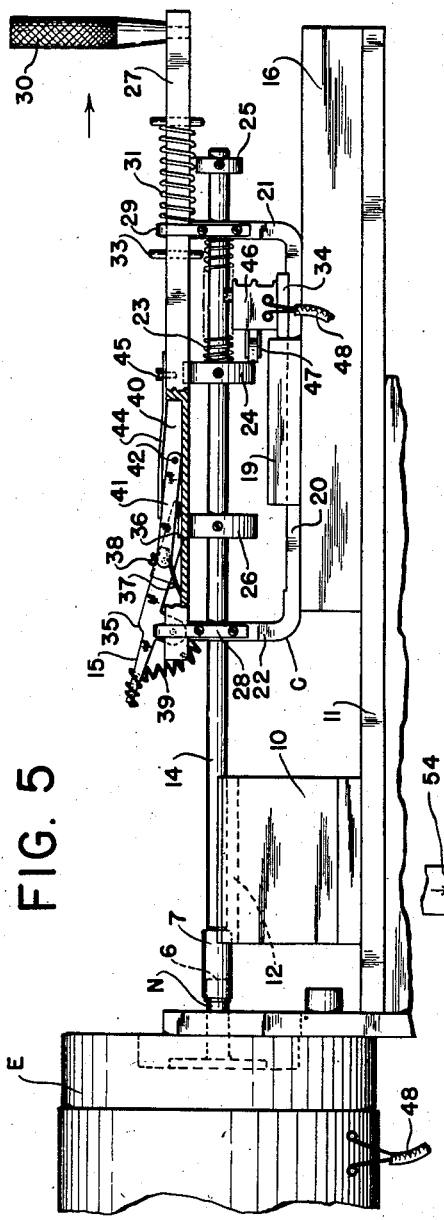
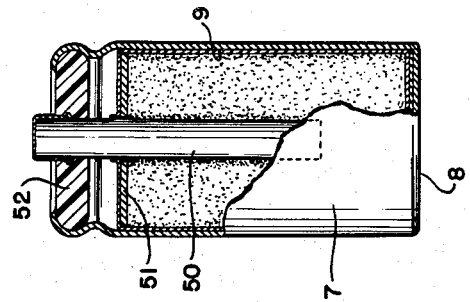
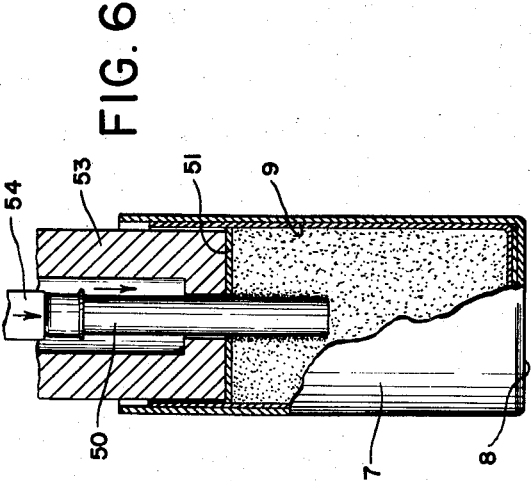
INVENTORS.
Edwin Pugsley, Jr.
BY Otto K. Reinhardt
ATTORNEYS

United States Patent Office 2,880,765
Patented Apr. 7, 1959

2,880,765

APPARATUS FOR INTRODUCING DEPOLARIZER INTO DRY CELL CANS

Edwin Pugsley, Jr., Hamden, and Otto K. Reinhardt, West Haven, Conn., assignors to Olin Mathieson Chemical Corporation, a corporation of Virginia Application December 18, 1953, Serial No. 399,091

2 Claims. (Cl. 141—193)

This invention relates to a method and apparatus for introducing a depolarizer mix or core into dry cell cans.

Dry cells, including those used in batteries for powering flashlights and for other purposes, generally comprise a metal cup or can, customarily formed of zinc and generally cylindrical in shape with a closed bottom, within which is contained the active material of the cell. A central carbon pencil which acts as one electrode of the cell is embedded in the active material contained in the can and protrudes from one end thereof, and the zinc can acts as the other electrode. The active material of the cell comprises primarily what is generally termed a depolarizing mix or mixture and an electrolyte. The depolarizing mix generally comprises a somewhat granular mixture of manganese dioxide and conductive carbon, and the electrolyte generally comprises a water solution of suitable salts, such as ammonium chloride and zinc chloride. The depolarizing mix is customarily separated from the interior walls of the zinc can by a member which may be formed of absorbent paper or other material which is permeable to the ions of the electrolyte solution but is impermeable to electron flow so as to insulate the depolarizing mix from the can while permitting flow of electrolyte therebetween. The carbon pencil is centrally embedded in the depolarizing mix within the can with one end of the pencil protruding from the can end of the can, the open end being sealed by suitable known means.

It is important in the manufacture of dry cells that the cell cans be rapidly filled with a predetermined amount of depolarizing mix. Uniformity in the can of such mix introduced into cells of a given size is particularly important because lack of such uniformity results in undesirable variations in the capacity of the finished cells. Previously known methods of introducing depolarizing mix into cell cans do not provide the desired speed of operation or uniformity of charge introduced and are undesirable in other respects.

With the above and other considerations in mind, it is proposed in accordance with the present invention to provide an improved method and improved apparatus for rapidly filling dry cell cans with uniform charges of depolarizing mix. A further object of the invention is to provide a method and apparatus by which a depolarizing mix containing a relatively high water content in the form of electrolyte solution may be rapidly and uniformly filled into cell cans with a result increase in cell capacity. Other objects of the invention include a depolarizing mix filling method and apparatus which avoids the formation of voids in the can, and does not involve the production of undesirable air-borne dust or dirt as an incident to the filling operation.

In general, the method of the invention involves extruding the mix in moist relatively pasty form into each dry cell can from a nozzle that enters the can and controlling the amount of mix so extruded by movement of the can due to the flow of mix into the can. More particularly, the method involves placing a dry cell can, which is first lined with a suitable paper or other liner, over an elongated extruder nozzle which has a mouth at its free end, the nozzle mouth substantially abutting the closed bottom of the can, then extruding a mass or column of the depolarizing mix, preferably in a liquid carrying and somewhat pasty state, into the can from the nozzle mouth, whereby the can is filled from the bottom upward and is by the force of the extrusion moved outwardly along the nozzle, and then finally discontinuing the extrusion in response to movement of the can in this fashion to a predetermined extent. The apparatus of the invention includes improved means for advancing the can over the nozzle, for initiating extrusion when the can is in proper position, and for stopping extrusion in response to outward movement of the can to a predetermined position along the nozzle. The depolarizing mix is preferably consolidated by holding the mass thereof at the desired level in the can while forcing the central carbon pencil into the mass of the mix.

The invention will be disclosed in connection with certain embodiments of the improved apparatus capable of carrying out the method. Such apparatus is illustrated in the accompanying drawings, in which—

Fig. 1 is a side elevation of apparatus embodying the invention shown in the position in which a filled can has been removed and replaced with an empty can preparatory to filling;

Fig. 2 is a plan view of the apparatus in the position illustrated in Fig. 1;

Fig. 3 is an elevation similar to Fig. 1, showing the apparatus in the position in which extrusion to fill a can is initiated;

Fig. 4 is an elevation similar to Fig. 1, showing the apparatus in the position in which extrusion is discontinued;

Fig. 5 is an elevation similar to Fig. 1, showing the apparatus in the position in which the can moving apparatus is being returned to the can removal and replacement position of Fig. 1 after a can has been filled;

Fig. 6 is a sectional elevation illustrating the consolidation of the depolarizing mix in the dry cell can; and Fig. 7 is an elevation, partly in section, illustrating a dry cell after filling in accordance with the invention and assembly.

Referring to the drawings, there is illustrated at E an extruder from which granular or pasty material may be extruded from an elongated cylindrical hollow nozzle N having a mouth 6 at its free end. The extruder N may be of known construction in which one or more worms or other advancing means act to force the extruded material from a feed hopper through the nozzle end and out of its mouth 6 when the extruder is in operation. Such an extruder also involves known mechanism by which extrusion may be initiated when an electric circuit is closed to connect driving power to the extruder mechanism, and extrusion may be discontinued when the electric circuit is broken. The extruder per se forms no part of the present invention, and may, for example, be of the type illustrated in U.S. Patent No. 2,241,222. The nozzle N extends horizontally and is of a diameter to fit snugly within but to clear sufficiently for relative movement the inside wall of a lined zinc dry cell can 7 of the size to be filled. As shown in Fig. 3, the nozzle N is longer than the can 7, so that the mouth of the nozzle may move to the closed bottom of the can. The can 7 illustrated is a conventional cylindrical drawn zinc can with an open top and a closed bottom 8.

Prior to filling, the bottom and sides of the can 7 are lined with a liner 9. The liner may comprise a sheet of absorbent or bibulous kraft paper rolled into a cylinder and folded over to cover the bottom of the can. The paper may be coated with starch paste or methyl cellulose, and instead of kraft, the liner 9 may be formed of other types of paper, regenerated cellulose or porous sheet of plastic or other material that is both permeable to ions and impermeable to electrons so that it provides an insulating layer through which the cell electrolyte may flow. Liners for dry cells are known and do not per se constitute the present invention.

A substantially horizontal base or frame 11 is secured to the extruder E and extends horizontally therefrom below the axis of the nozzle N. A can supporting block 10 is secured to the base 11 adjacent the nozzle N, and the block 10 is provided with a substantially horizontal V-shaped groove 12 in its upper face. The groove 12 is so disposed as to support a dry cell can 7 in alignment with the axis of the nozzle N. Each can to be filled is moved onto the nozzle N as hereinafter explained.

Means are provided for moving the can 7 to be filled over and into slidably engaging relation with the nozzle N, for starting extrusion when the mouth of the nozzle N is adjacent the can bottom and for discontinuing extrusion when the can has been moved off of the nozzle to a predetermined extent indicative of a filling of the can with the desired amount of depolarizing mix. In the disclosed embodiment, this means takes the form of a plunger bar 14 and certain associated supporting and operating mechanism, as hereinafter described.

A carriage C of generally U-shape is slidably supported on a block 16 which, in turn, is adjustably fixed to the base 11 by bolts 17 passing through slots 18 in the block 16. A U-block 19 embracing the horizontal bar 20 of the carriage C and secured to the block 16 slidably mounts the carriage for movement along a path parallel to the axis of the extruder nozzle N. The upright end members 21 and 22 of the carriage C slidably support the plunger bar 14 in suitable aligned openings. The path of movement of the bar 14, either relative to the carriage C or due to sliding movement of the carriage on the block 16, is along the axis of the extruder nozzle N. A coiled spring 23 surrounds the bar 14 and is compressed between a stop collar 24 fixed to the bar and the outer end member 21 of the carriage C. A stop collar 25 fixed to the bar 14 beyond the carriage end member 21 limits inward movement of the bar relative to the carriage. A third stop collar 26 is fixed to the bar 14 and is employed to secure the bar in its retracted or outer position relative to the carriage C when the spring 23 is compressed as hereinafter explained.

A trigger release bar 27 is slidably secured to the carriage C by suitable means, such as the brackets 28 and 29. A handle 30 is fixed to the trigger release bar 27 adjacent its outer end. A coiled spring 31 surrounds the bar 27 and is compressed between a stop pin 32 passing through the bar 27 and the outer face of the carriage end member 21. A second stop pin 33 extends through the bar 27 and engages the inner face of the carriage end member 21 so as to limit outward movement of the bar 27 when the spring 31 expands. The spring 31 is more resistant to compression than is the spring 23, and as a consequence, manual force exerted on the handle 30 in the inward direction indicated by the arrow in Fig. 1 first moves the carriage C relative to the block 16 and base 11 until a block 34, fixed to the carriage, engages the block 19, whereupon the trigger release bar 27 moves inward relative to the carriage with consequent compression of the spring 31.

A plunger bar catch 35 is pivotally secured to the inward end member 22 of the carriage C directly above the plunger bar 14. The catch 35 has a shoulder 36 on the under side of its outward extending portion which is engageable with the stop collar 26 on the plunger bar 14, as shown in Figs. 1 and 5. A cam 37 of sheet metal is secured to the outer portion of the catch 35 by suitable means, such as a screw 38, as best shown in Figs. 2, 3 and 5. The catch 35 is biased to turn clockwise about its pivot, as shown in Fig. 1, by the weight of its outward portion, and this bias may be increased by a coiled compression spring 39 compressed between the inward end 15 of the catch and the carriage end member 22, as shown.

A recess 40 is provided in the trigger release bar 27, and a link 41 is disposed in this recess and pivotally secured to the bar 27 by a pivot screw 42 passing through the link 41 adjacent its outer end. A pin 43 is fixed to and extends laterally from the link 41 adjacent its inner free end. The pin 43 extends toward the trigger release bar 27 and is in line with the cam 37 on the catch 35, as shown in Figs. 1 and 2. A flat spring 44 secured to the upper face of the trigger release bar 27 by a screw 45 overlaps the recess 40 and bears on the upper face of the link 41 so as to bias this link toward its lowered or retracted position, as shown in Figs. 1, 2 and 4.

A micro switch 46 is secured to the block 34 and so to the carriage C. The operating arm 47 of the micro switch 46 is disposed in alignment for operating engagement by the collar 24 on the plunger bar 14. The micro switch 46 is of known construction and acts when its operating arm 47 is released to close a circuit for starting operation of the extruder E whereby depolarizing mix is extruded from the mouth 6 of the nozzle N. When the operating arm 47 of the micro switch 46 is moved outward by engagement of the collar 24 thereof, as shown in Figs. 1, 2, 4 and 5, the micro switch opens the circuit and the operation of the extruder E is stopped. A cable 48 connecting the micro switch 46 to the extruder E illustrates the described control of the extruder by the micro switch.

In operating the disclosed apparatus to carry out our improved method, the extruder E is charged with depolarizing mix containing electrolyte solution sufficient to form the mix into a pasty or coherent consistency. Depolarizing mix containing electrolyte which is useful in the present invention may contain from about 60 to 65% manganese dioxide, about 8 to 10% conductive carbon in the form of acetylene black or graphite, or both, about 10 to 15% ammonium chloride, and about 4 to 12% zinc chloride. The water content of the mix may be from about 6 to 25% but a preferred water content range is from about 8 to 15%. The manganese dioxide and carbon dioxide with a part of the dry ammonium chloride are preferably mixed in the dry state, and the aqueous solution of zinc chloride and the remaining ammonium chloride are added to produce the final composition which is then mixed to a homogeneous state and is ready for extrusion. With the apparatus in the position illustrated in Figs. 1 and 2, a dry cell 7, previously lined with a liner 9, as explained, is placed in the groove 12 of the block 10, with the open end of the can directed toward the extruder nozzle N. The handle 30 is then moved inward toward the nozzle. This first moves the carriage C to the point where the block 34 abuts the block 19. During this movement, the plunger bar 14 moves the open mouth of the can 7 over the end of the extruder nozzle N. Continued inward movement of the handle 30 moves the trigger release bar 27 relative to the carriage C, the spring 31 being compressed. During such movement of the bar 27, the pin 43 engages the cam 37 on the catch 35 and turns the catch counterclockwise about its pivot, thereby disengaging the catch shoulder 36 from the stop collar 26 on the plunger bar 14. When thus released, the plunger bar is suddenly moved inward relative to the carriage C by the spring 23 to the position illustrated in Fig. 3, sliding the can 7 along the nozzle N until the mouth 6 of the nozzle abuts the closed bottom of the can. This movement of the plunger bar 14 also moves the collar 24 away from the operating arm 47 of the micro switch 46, which results in starting operation of the extruder. The position of the parts when the plunger bar 14 has thus moved the can onto the nozzle at the start of extrusion is illustrated in Fig. 3.

The depolarizing mix extruded from the mouth 6 of the nozzle N moves the can outwardly along the nozzle and so forces the plunger bar 14 outward relative to the carriage C against the bias of the spring 23 to the point where the collar 24 engages and moves the micro switch operating arm 47 outward and so discontinues operation of the extruder. The handle 30 is held stationary during this operation so that the spring 31 remains compressed and the carriage C does not move. The fact that the extruded depolarizing mix is forced from the nozzle N against the pressure exerted by the plunger bar spring 23 insures that the mix is compacted into the cell can under a uniform pressure. At the point where the plunger bar collar 24 operates the micro switch 46, the shoulder 36 of the catch 35 engages the collar 24 and so secures the plunger bar in its retracted position relative to the carriage C. Fig. 4 illustrates the position of the parts at this point where extrusion is completed.

Upon completion of extrusion, the operator permits the handle 30 and bar 27 to move outward in the direction of the arrow in Fig. 5. The initial outward movement is caused by expansion of the spring 31. During such movement, the pin 43 on the link 41 rides up over the catch cam 37, as shown in Fig. 5, the link 41 rising slightly to permit this operation. When the stop pin 33 engages the inner face of the outer carriage member 21, the operator pulls outward on the handle 30 and so slides the carriage C to its outer position, which is illustrated in Fig. 1. The filled can is then removed from the nozzle end and an empty can is placed in the groove 12 of the block 10. The described operation is repeated with successive cans which are thus uniformly charged with a predetermined amount of uniformly compacted depolarizing mix and electrolyte.

It is preferred to consolidate the depolarizing mix in the dry cell can during assembly of the filled can to form a completed dry cell. This operation is illustrated in Fig. 6. A centrally perforated cardboard washer 51 or its equivalent is placed on top of the depolarizing mix inside the liner 9, and the mix is held at the desired level by inserting a centrally apertured punch or similar device 53 into the open end of the can 7 and into contact with the washer 51, and holding the can and punch against relative movement while forcing the carbon pencil 50 down into the mass of the depolarizing mix to the position it occupies in the finished cell. A push rod 54 or other suitable instrument may be employed to force the carbon pencil down into the mix. Insertion of the carbon pencil while holding the mix to a volume defined by the can and the punch held washer 51 results in consolidating the mix to the extent that a part of the mix is displaced by the carbon pencil. Following such consolidation, the punch 53 is removed, the top of the liner 9 is folded down over the top of the washer 51 and a suitable closure is added, such as the polyethylene washer 52, which may be inserted into the open mouth of the can and fixed in place by spinning the can inward above and below the washer, as shown.

By our improved method, the depolarizing mix and electrolyte may be rapidly introduced into dry cell cans in accurately controlled and uniform amounts and without the need for shaping, compacting or other formation of the mix prior to its introduction. It has been found in actual use that dry cells in large numbers can be successively filled with substantially the same weight of depolarizer mix, the maximum variation in the filling of different cans amounting to only a few tenths of a gram. Our invention makes it possible to use a depolarizing mix containing a substantially higher water content than that employed in previously known can filling procedures, with the result that the electrical capacity of the cells filled by our method is increased. By filling the cans from the bottom, a solid mass of depolarizing mix is produced and the formation of voids in the cans is avoided. Since the depolarizing mix is introduced in a moist or pasty state, the hazards and inconvenience of dust and dirt that accompany operations with dry mixes are avoided.

It should be understood that the method and apparatus of the present invention are readily adaptable to fully automatic operation in which the empty cans are fed and the filled cans are removed by suitable automatic means, and the filling carriage and its mechanism are automatically reciprocated.

We claim:

1. Apparatus for introducing depolarizing mix into a dry cell can comprising an extruder including an elongated outlet nozzle having a mouth at its outer end through which depolarizing mix is expelled when said extruder is in operation, a carriage, means slidably mounting said carriage for movement toward and away from said nozzle mouth, an elongated plunger substantially aligned with said nozzle slidably supported on said carriage and movable relative to said carriage toward and away from said nozzle mouth, a spring engaging said plunger biasing the same to move toward said nozzle mouth, a catch on said carriage releasably holding said plunger against movement by said spring, a release bar slidably mounted on the carriage, said release bar moving said carriage toward the nozzle, means for arresting the movement of the carriage, and means carried by the release bar to release the plunger catch upon further movement of the release bar to cause the plunger to move toward the nozzle under the force of the spring.

2. Apparatus in according with claim 1 wherein the extruder is controlled by a switch arranged in the path of the plunger and actuated by the plunger to initiate and arrest the flow of material from the extruder.

References Cited in the file of this patent

UNITED STATES PATENTS

| | | |
|---|---|---|
| 110,155 | Nordyke | Dec. 13, 1870 |
| 744,644 | Thom | Jan. 12, 1904 |
| 925,300 | Coleman | June 15, 1909 |
| 990,823 | Nungesser | Apr. 25, 1911 |
| 1,285,301 | Sangers | Nov. 19, 1918 |
| 1,329,965 | Foos | Feb. 3, 1920 |
| 2,136,224 | Weinreich | Nov. 8, 1938 |
| 2,517,107 | Hessert | Aug. 1, 1950 |
| 2,553,684 | Soulen | May 22, 1951 |
| 2,612,016 | Anderson | Sept. 30, 1952 |